May 13, 1952     C. W. BAUBERGER     2,596,464
HOT AND COLD WATER MIXING FAUCET WITH SINGLE HANDLE
Filed March 21, 1947     2 SHEETS—SHEET 1

INVENTOR.
Charles W. Bauberger
BY
ATTORNEY

May 13, 1952     C. W. BAUBERGER     2,596,464
HOT AND COLD WATER MIXING FAUCET WITH SINGLE HANDLE
Filed March 21, 1947     2 SHEETS—SHEET 2
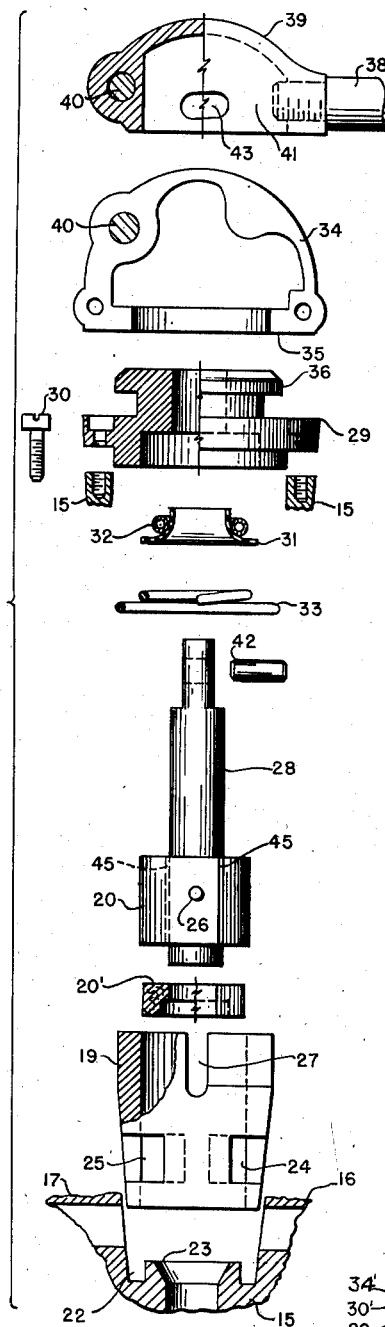
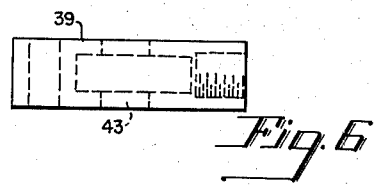
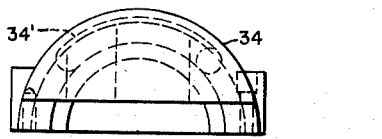
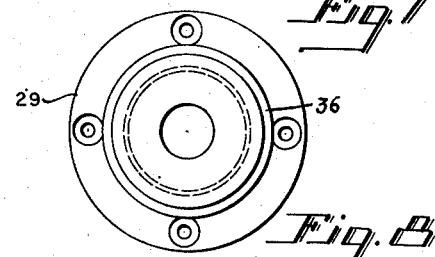
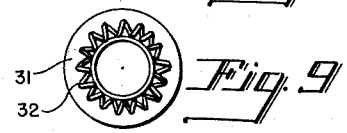
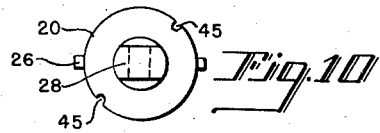
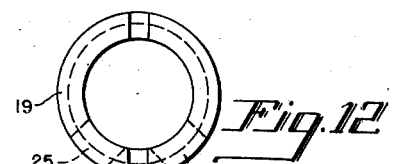
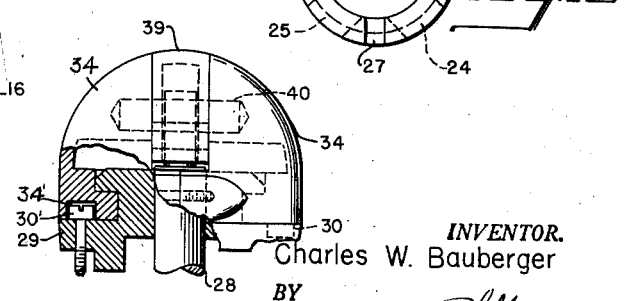
INVENTOR.
Charles W. Bauberger
BY
K. S. Allyn
ATTORNEY Patented May 13, 1952

2,596,464

UNITED STATES PATENT OFFICE 2,596,464

HOT AND COLD WATER MIXING FAUCET WITH SINGLE HANDLE

Charles W. Bauberger, Malverne, N. Y.

Application March 21, 1947, Serial No. 736,167

3 Claims. (Cl. 277—25)

The main object of my invention is to provide a faucet that is simple and reliable and capable of embodiment in an attractive form that can be made to harmonize with modern fixtures.

Accordingly, I have devised a construction consisting of a housing having fixed hot and cold water supply inlets and a single swinging discharge outlet. A control valve is formed of two parts, one of which is a tubular sleeve rotatable in the housing and the other part is a cylindrical plunger reciprocable in and rotatable with the tubular part. The cylindrical part of the valve has a stem with a sliding bearing in the head of the housing. The actuating handle is in the form of a lever hinged in a hood which encloses the head of the housing and has a pin and slot connection with the stem of the valve.

Fig. 5 is an exploded vertical projection and section of parts of the valve and housing.

Fig. 6 is a plan view of a part of the handle.

Fig. 7 is a plan view of one half of the hood.

Fig. 8 is a plan view of the head of the housing.

Fig. 9 is a plan view of the upper seal or packing for the stem of the plunger.

Fig. 10 is a plan view of the vertically movable plunger valve member.

Fig. 11 is a plan view of the outlet packing washer.

Fig. 12 is a plan view of the rotatable valve sleeve.

Fig. 13 is a side and vertical sectional view of the hood taken on a plane at right angles to the section of Fig. 1.

Figure 1:
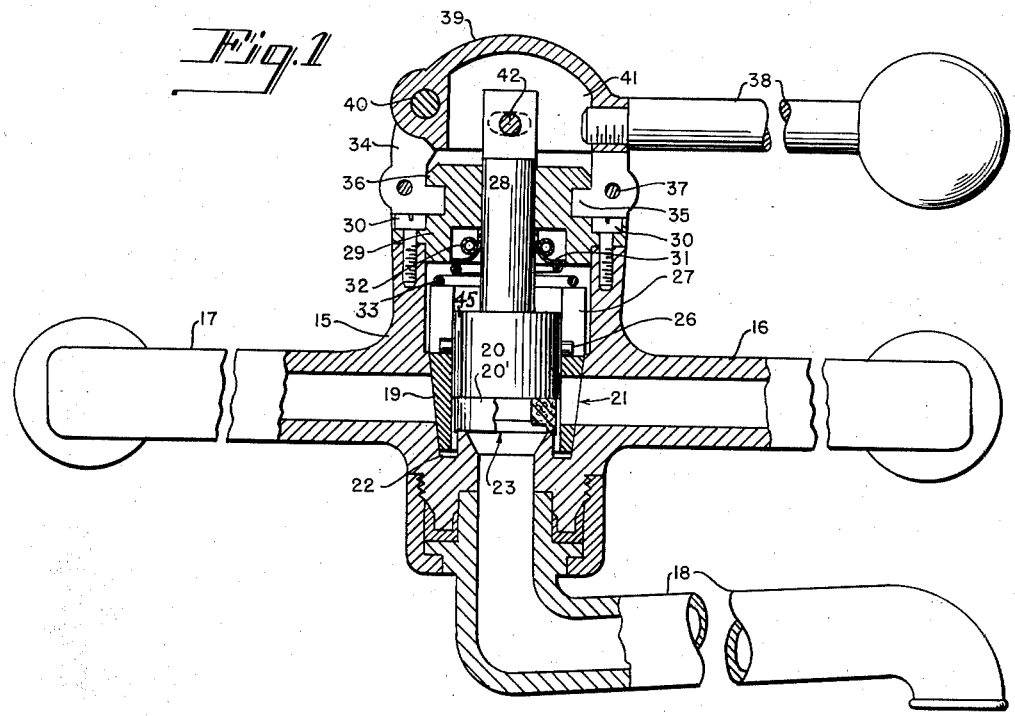
Fig. 1 is a vertical sectional view of a faucet involving my invention with the parts shown in the shut off position.

The housing 15 has tubular inlet branches 16 and 17 adapted to be connected to cold and hot water supply pipes in any suitable manner and a discharge or outlet member 18 preferably adapted to be swung from side to side in any suitable manner.

The valve consists of the two parts 19 and 20. The part 19 is in the form of a rotatable sleeve having a conical or tapered outer wall having a ground fit in a seat 21 in the housing. The lower end of this sleeve is guided in a groove 22 in the housing surrounding the outlet valve seat 23. This sleeve has two passages 24 and 25, arranged at approximately 90° to each other, for the cold and hot water, respectively. The lower end of the valve plunger member 20 has a yielding washer 20' of a little smaller diameter than the part 20. The cylindrical part 20 of the valve is reciprocable in the sleeve 19 and rotatable with the sleeve by reason of a pin 26 and a slot 27 connection and has a stem 28 which has a rotatable and reciprocable bearing in the head 29 of the housing.

This head is secured to the main part of the housing by two or more screws, in this case three screws 30, which are set into the rim of the head 29 flush with the surface of the rim, and one screw 30', the head of which projects beyond the surface. A flexible backing washer 31 and a sphincter spring 32 surround the stem 28 immediately below the head and a spring 33 presses between the head and the upper end of sleeve 19 to hold the latter to its seat in the housing.

The upper end of the head is surrounded by a hood formed of two parts 34, 34 which have flanges 35 fitting beneath the peripheral flange 36 of the head and held together by screws 37.

The handle lever 38 has a cap piece 39 shaped on top to conform to the contour of the hood and hinged at 40 between the parts 34, 34. This cap has a chamber 41 into which the upper end of the stem 28 of the valve extends. A pin 42 extends through the end of the stem into elongated slots 43 in the sides of the cap 39.

The valve member 20 has one or more passages 45 extending from top to bottom so as to equalize the pressure above and below the plunger. Without such relief passages water trapped in the chamber above the plunger would prevent raising the plunger. If air were trapped above the plunger it would act as an elastic cushion and tend to close the valve when the handle was released.

Rotation of the valve is limited by screw 30', the head of which projects above the rim of the head 29 and extends into a slot or groove 34' which extends 90° around one side of the hood. The ends of this groove constitute stops to limit the turning of the valve to the all hot or all cold position.

The extension of the sleeve 19 into the groove 22 which is around the seat 23 prevents the water pressure from working beneath the valve when the valve plunger is down. When the outlet is closed the line pressure is exerted through the passages 45 to the upper face of the plunger and thus tends to hold the valve to its seat.

Figure 2:
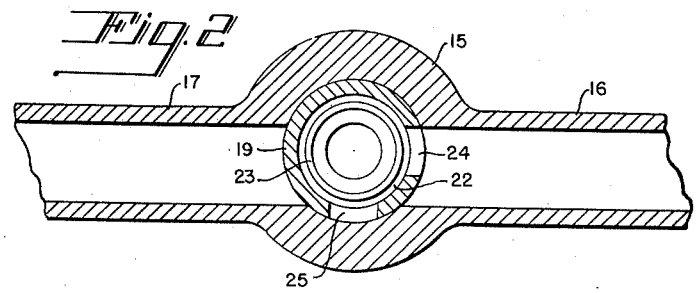
Fig. 2 is a fragmentary horizontal sectional view with the valve shown in position for drawing cold water.
Figure 3:
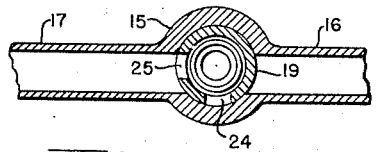
Fig. 3 is a similar view on a smaller scale with the valve in position for drawing hot water.
Figure 4:
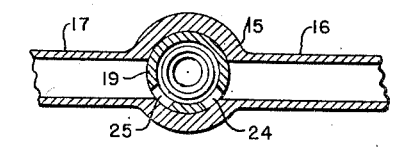
Fig. 4 is a view similar to Fig. 3 but with the valve in position for drawing part cold and part hot water.

With the valve parts in the position of Figs. 1 and 2, if the valve plunger part 20 is raised, cold water from branch 16 will flow through passage 24 in the valve sleeve 19 beneath washer 20' and through the outlet in valve seat 23, the amount of flow being controlled by the vertical movement of the valve part 20. As the valve is rotated to the position of Fig. 4 hot water is admitted from branch 17 through passage 25 and some of the cold water is cut off. By rotating the valve to the position of Fig. 3 the cold water is entirely cut off. It will also be noted that the valve can be rotated from hot to cold positions and vice versa, without opening the valve at all. When the handle and hood are turned to the extreme right or the extreme left and the handle is depressed the faucet is turned "off." It can also be turned "off" at any intermediate position of the valve when the handle is depressed.

I claim:

1. A mixing faucet comprising a housing having two inlets and an outlet, a valve for controlling the inlets and outlet comprising a rotatable sleeve having two inlet passages arranged at approximately right angles to each other for coacting with the inlets and a plunger member rotatably connected with the sleeve and reciprocable in the sleeve for varying the effective openings of the inlets and for closing the outlet, a head secured to the housing, the plunger member having a stem extending through said head, a dome-shaped and slotted hood encircling said head and a handle lever having a cap fitted within the hood slot, said cap being shaped to conform to the shape of the hood and having a connection with said stem, said hood and cap enclosing the upper end of said stem and its connection with the cap, the outer contour of said hood and cap conforming to the outer contour of the external parts of the faucet.

2. A mixing faucet comprising a housing having two inlets and an outlet, a valve for controlling the inlets and outlets comprising a rotatable sleeve having two inlet passages for coacting with the inlets of the housing and a cylindrical plunger member rotatably connected with the sleeve and reciprocable in the sleeve for varying the effective openings of the inlets and for closing the outlet, a head secured to the housing, the cylindrical valve member having a stem extending through said head, a dome-shaped hood formed of two parts, with a slot therebetween, encircling said head and a handle lever having a cap fitted within the slot between the two parts of the hood, said cap being shaped to conform to the shape of the hood and having a pin and slot connection with said stem, said hood and cap enclosing the upper end of said stem and its connection with the cap, the outer contour of said hood and cap conforming to the outer contour of the external parts of the faucet.

3. A mixing faucet comprising a body having a central chamber with a conical side wall seat and oppositely located entrance passages and a central outlet passage and having a valve seat surrounding the outlet passage, a rotatable valve sleeve seated in said wall and having entrance openings adapted to register with the entrance passages, a valve plunger rotatable with and reciprocable in said sleeve and having a sealing washer at its lower end adapted to engage said valve seat, a head having a central bearing, means for securing said head to said body, said plunger having a stem rotatable and reciprocable in said bearing, a spring interposed between said head and said valve sleeve for yieldingly holding said sleeve to its seat in said wall, a dome-shaped and slotted hood rotatably mounted on said head and covering said securing means, a cap piece fitted within the slot between the parts of said hood and connected to the upper end of the stem of the plunger, said cap piece being shaped to conform to the shape of the hood and a handle connected to said cap piece, said hood and cap piece enclosing the upper end of the stem and the connections between the stem and the cap piece and between the cap piece and handle, the outer contour of said hood and cap piece conforming to the outer contour of the external parts of the faucet.

CHARLES W. BAUBERGER.

REFERENCES CITED

The following references are of record in the file of this patent:

UNITED STATES PATENTS

| Number | Name | Date |
|---|---|---|
| 470,270 | Vangezell | Mar. 8, 1892 |
| 628,783 | Fisher | July 11, 1899 |
| 628,786 | Frishmuth | July 11, 1899 |
| 690,011 | Blake | Dec. 31, 1901 |
| 742,327 | Huye | Oct. 27, 1903 |
| 781,525 | Isaacs | Jan. 31, 1905 |
| 998,496 | Godleskie | July 18, 1911 |
| 1,882,953 | Saelzler | Oct. 18, 1932 |
| 2,087,223 | Thompson | July 13, 1937 |

FOREIGN PATENTS

| Number | Country | Date |
|---|---|---|
| 60,928 | Switzerland | of 1913 |